United States Patent [19]

Penick

[11] Patent Number: 4,705,621
[45] Date of Patent: Nov. 10, 1987

[54] CATALYTIC REACTOR SYSTEM WITH CROSSCURRENT LIQUID AND GASFLOW

[75] Inventor: Joe E. Penick, Princeton, N.J.

[73] Assignee: Mobil Oil Corporation, New York, N.Y.

[21] Appl. No.: 714,776

[22] Filed: Mar. 22, 1985

[51] Int. Cl.[4] .............................. B01J 8/08
[52] U.S. Cl. ..................... 208/146; 261/94; 261/95; 422/211; 422/220
[58] Field of Search ............... 422/211, 212, 216, 218, 422/220; 261/94, 95; 208/146, 166

[56] References Cited

U.S. PATENT DOCUMENTS

| 2,500,235 | 3/1950 | Beckberger. | |
|---|---|---|---|
| 2,913,404 | 11/1959 | Lieffers et al. | 202/166 |
| 3,186,935 | 6/1965 | Vaell | 208/59 |
| 3,296,775 | 1/1967 | Squires | 55/98 |
| 3,533,754 | 10/1970 | Hallman. | |
| 3,549,295 | 12/1970 | de Galocsy et al. | 165/106 |
| 3,898,049 | 8/1975 | Burroughs et al. | 208/146 |
| 4,033,727 | 7/1977 | Vautrain | 208/146 |
| 4,126,539 | 11/1978 | Derr et al.. | |
| 4,169,879 | 10/1979 | Descoins et al. | 422/220 |
| 4,568,524 | 2/1986 | Pelrine | 422/218 |
| 4,588,560 | 5/1986 | Degnan et al. | 422/211 |

FOREIGN PATENT DOCUMENTS 778776 11/1980 U.S.S.R. .................. 422/220

Primary Examiner—Barry S. Richman
Assistant Examiner—William R. Johnson
Attorney, Agent, or Firm—Alexander J. McKillop; Michael G. Gilman; L. G. Wise

[57] ABSTRACT

A crossflow reactor and operating technique provides a porous body of contact solids, such as a fixed catalyst bed, contained in a sloping configuration. Liquid, such as hydrocarbon oil, to be treated is applied to the bed surface and flows by gravity through the porous solid. Reactant gas flows transverse to the liquid, providing a horizontal component to the liquid to improve contact efficiency.

11 Claims, 4 Drawing Figures

CATALYTIC REACTOR SYSTEM WITH CROSSCURRENT LIQUID AND GASFLOW

BACKGROUND OF THE INVENTION

This invention relates to catalytic reactor operation wherein a liquid phase is treated with a gaseous reactant. In particular it relates to a technique for contacting multi-phase reactants in a fixed porous catalyst bed under continuous operating conditions, including methods and apparatus for controlling transverse fluid flow in the reactor.

Chemical reactions between liquid and gaseous reactants present difficulties in obtaining intimate contact between phases. Such reactions are further complicated when the desired reaction is catalytic and requires contact of both fluid phases with a solid catalyst. In the operation of conventional co-current multiphase reactors, the gas and liquid tend to travel different flow paths. The gas phase flows in the direction of least pressure resistance; whereas the liquid phase flows by gravity in a trickle path over and around the catalyst particles. Channel flow and gas frictional drag tend to make the liquid flow non-uniformly, thus leaving portions of the catalyst bed underutilized due to lack of adequate wetting.

Various attempts have been made to avoid maldistribution, such as the provision of multiple layers of catalyst with interlayered redistributors located along the reactor longitudinal axis. Numerous multi-phase reactor systems have been developed wherein a fixed porous bed of solid catalyst is retained in a reactor. Typically, fixed bed reactors have been arranged with the diverse phases being passed cocurrently over the catalyst, for instance as shown in U.S. Pat. Nos. 4,126,539 (Derr et al), 4,235,847 (Scott), 4,283,271 (Garwood et al), and 4,396,538 (Chen et al). Other known techniques for contacting liquid-gas mixtures with solid catalysts include slurry catalyst, ebullated bed, crosscurrent and countercurrent systems, such as disclosed in U.S. Pat. Nos. 2,717,202, 3,186,935, 4,221,653, and 4,269,805. The above cited patents are incorporated herein by reference.

In the petroleum refining industry, multi-phase catalytic reactor systems have been employed for dewaxing, hydrogenation, desulfurizing, hydrocracking, isomerization and other treatments of liquid feedstocks, especially distillates, lubricants, heavy oil fractions, residuum, etc. In a preferred hydrodewaxing process the catalyst comprises a medium pore siliceous zeolite having a constraint index of about 1 to 12, for example, an acidic ZSM-5 type pentasil aluminosilicate having a silica to alumina mole ratio greater than 12.

While prior reactor systems are satisfactory for certain needs, efficient multi-phase contact has been difficult to achieve for many fixed bed applications. It is an object of the present invention to provide a unique reactor system, including crosscurrent operating techniques and apparatus, for improved treatment of liquid with a gaseous reactant in a reactor containing a porous fixed bed of solid catalyst. It is a further object to provide a technique for operating multi-phase reactors under controlled flow conditions to maintain substantially uniform gas-liquid contact, while minimizing flow maldistribution patterns and providing horizontal gas motion simultaneously with a downwardly gravitating liquid motion.

SUMMARY OF THE INVENTION

In the process of treating a liquid stream, such as hydrocarbon oil, with a gaseous stream in a contact zone containing a porous bed of contact solids, an improved technique has been discovered for maintaining uniform distribution of liquid and gas phases. An operating method and means are provided for distributing the liquid stream at spaced points across the contact solids at a primary bed surface, while containing the contact solids with the primary bed surface sloping outwardly and downwardly from an upper contact zone toward a lower contact zone by supporting the bed with a foraminous screen, louvered wall or the like. The primary bed surface faces the distributed liquid stream to admit at least a portion of the liquid stream into the porous bed through the primary bed surface, while permitting unadmitted liquid to flow by gravity downwardly across the sloping primary surface, and maintaining gravity flow of liquid through said porous bed. A second foraminous partition means is provided for containing the contact solids with a secondary bed surface substantially parallel to the primary bed surface. By introducing the gaseous stream to the contact zone through the primary bed surface and directing the gas flow toward the secondary bed surface transverse to liquid flow, a horizontal vector is imposed on the liquid flow to drive gravitating liquid across the bed. Outlet means is provided for recovering the treated liquid and gas streams downstream from the porous bed.

These and other features and advantages of the invention will be seen in the following description and drawing.

THE DRAWING

DESCRIPTION OF PREFERRED EMBODIMENTS

Figure 1:
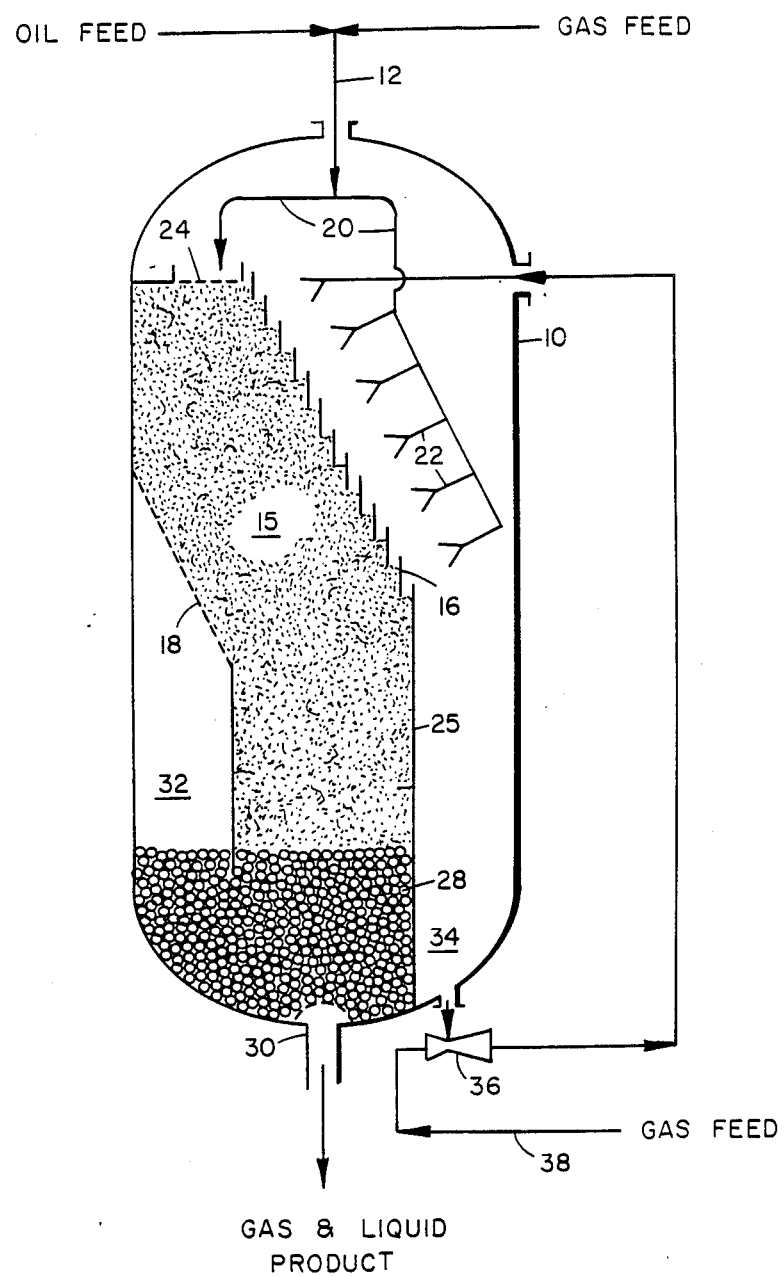
FIG. 1 is a simplified process diagram showing a vertical reactor with fixed catalyst bed, major flow streams, and distribution elements.

Referring to FIG. 1, a vertical reactor vessel is shown schematically, including a pressurized enclosed reactor shell 10 having top inlet means 12 for liquid and gaseous reactant streams above a porous contact bed 15 of catalyst solids. Catalyst containment means within the reactor vessel retains the fixed porous bed of catalyst particles for multiphase cross-current catalytic treatment. Liquid distributor means 20 is adapted for applying liquid reactant onto a top portion of the catalyst bed through a spaced array of spray nozzles 22 and a top distributor plate 24 above the fixed bed 15.

The bed containment means has rectilinear foraminous walls 16, 18 for admitting and removing reactant gas in crosscurrent flow transverse to gravitational liquid flow, including at least one foraminous containment surface sloping outwardly from the porous catalyst bed on one side thereof. The spray nozzles 22 provide liquid projection means for distributing reactant liquid onto the outwardly sloping primary bed surface 16, whereby at least a portion of liquid reactant passes through the foraminous surface into the porous catalyst bed 15. While the primary sloping wall 16 is depicted as a series of overlapping parallel louvers, a grid plate, perforated sheet, woven screen or similar containment means may be employed for either the top primary surface 16 or the parallel bottom secondary surface 18. A bottom enclosed vertical reaction zone 25 may be disposed to receive reaction products from the upper contact zone 15. Vertical height of zone 25 should be at least as great as the bed thickness between foraminous walls in the upper reaction zone 15 to prevent shunting of fluids. The entire bed may be supported at the bottom of the reactor shell by inert ceramic balls 28. Outlet 30 provides means for recovering catalytically treated liquid and depleted gas below the porous bed.

While a portion of reactant gas may be dissolved or entrained in liquid flowing through the bottom reaction zone 25, the major amount of unreacted gas and vapor byproduct is recovered downstream by passing through the secondary containment wall 18 into a plenum chamber 32 and thus through the catalyst support 28 to the outlet. Treated liquid also may pass through this recovery path.

The rate of liquid application to the primary bed surface may exceed the rate at which liquid can be admitted through the foraminous wall 16, resulting in a cascade of overflowing liquid outside the bed and down the outside solid partition and containing catalytic reaction zone 25 to a liquid accumulator chamber 34. Excess liquid may be removed by a sump pump or eductor 36 for recycle to the reactor top by a pressurized gas stream 38.

The present technique is adaptable to a variety of interphase catalytic reactions, particularly for treatment of heavy oils with hydrogen-containing gas at elevated temperature. Industrial processes employing hydrogen, especially petroleum refining, employ recycled impure gas containing 10 to 50 mole % or more of impurities, usually light hydrocarbons and nitrogen. Such reactant gases are available and useful herein, especially for high temperature hydrogenation or hydrogenolysis at superatmospheric pressure.

In the refining of lubricants derived from petroleum by fractionation of crude oil, a series of catalytic reactions are employed to severely hydrotreat, convert and remove sulfur and nitrogen contaminants, hydrocracking and isomerizing components of the lubricant charge stock in one or more catalytic reactors. This can be followed by hydrodewaxing and/or hydrogenation (mild hydrotreating) in contact with different catalysts under varying reaction conditions. An integrated three-step lube refining process disclosed by Garwood et al, in U.S. Pat. No. 4,283,271 is adaptable to crosscurrent processing according to the present invention.

At the point of entry the reactant gas has its greatest concentration. Depletion of the gaseous reactant downstream will increase the relative concentration of inerts and/or byproduct vapors. Likewise, the liquid being treated is generally more reactive at the upper end of the reactor system where it contacts the fresh reactant gaseous phase.

In a typical multi-phase reactor system, the average gas-liquid volume ratio in the catalyst zone is about 1:4 to 20:1 under process conditions. Preferably the liquid is supplied to the catalyst bed at a rate to occupy about 10 to 50% of the void volume adjacent the primary bed surface. In those reactions wherein the volume of gas decreases due to reactant depletion, the volumetric ratio of liquid to gas can increase markedly as the liquid feedstock and gas pass through the reactor. Vapor production, adiabatic heating or expansion can also affect the volume. In general, the quantity of unreacted gas in the contact zone should be adequate to provide a mixed phase bulk density of at least 10% of the bulk density of the liquid phase (at reaction conditions).

Advantageously, the multi-phase reactor system is operated to achieve uniform distribution. If too little liquid flux is maintained, the catalyst surface in the porous bed may become dry or permit excessive channeling of the gas phase. Flow rates for both reactant phases are controlled within constraints, whereby proper operation of the reactor can be assured.

In order to maintain a desirable uniform flow of reactant streams through the fixed catalyst bed, adequate flow paths for liquid and gaseous phases should be provided. In a continuous process the ratio of reactant gas to liquid feedstock and the space velocity of reactants relative to catalyst must be carefully considered. Achievement of uniform liquid flow through a porous bed of solids can be obtained if the catalyst is properly distributed and shaped. The void volume in a reaction zone is a function of catalyst configuration and loading technique. While a densely packed bed of spherical solids may be employed to place a maximum amount of catalyst in a predetermined reactor volume, the low void fraction may interfere with fluid flow, especially where crosscurrent flow of two phases is required. Advantageously, the catalyst bed has a void volume fraction greater than 0.25. Void fractions from 0.3 to 0.9 can be achieved using loosely packed polylobal or cylindrical extrudates. Hollow ring-type supported catalysts, such as Raschig rings or the like, permit liquids to flow downwardly through the porous bed by gravity while the gas phase flows transversely through the denser liquid, providing a horizontal liquid flow component for uniformly wetting catalyst to enhance mass transfer and catalytic phenomena.

Catalyst size can vary widely within the inventive concept, depending upon process conditions and reactor structure. If a low space velocity or long residence in the catalytic reacton zone is permissible, catalysts having an average maximum dimension of 1 to 5 mm may be employed. Relatively small catalyst particles may be loaded randomly to assure uniformity and larger supported catalysts may be averaged in a geometric pattern to achieve optimum bed utilization.

Reactor configuration is an important consideration in the design of a continuously operating system. In its simplest form, a vertical pressure vessel is provided with a catalyst bed of rectangular cross-section. A typical vertical reactor having a catalyst bed length to average width ratio of about 1:1 to 8:1 is preferred. A single bed or a stacked series of beds may be retained within the same reactor shell. Reactors of uniform horizontal cross section may be employed and other non-uniform configurations, such as conoidal reactors, tapered vessels, etc., may also be employed.

Figure 2:
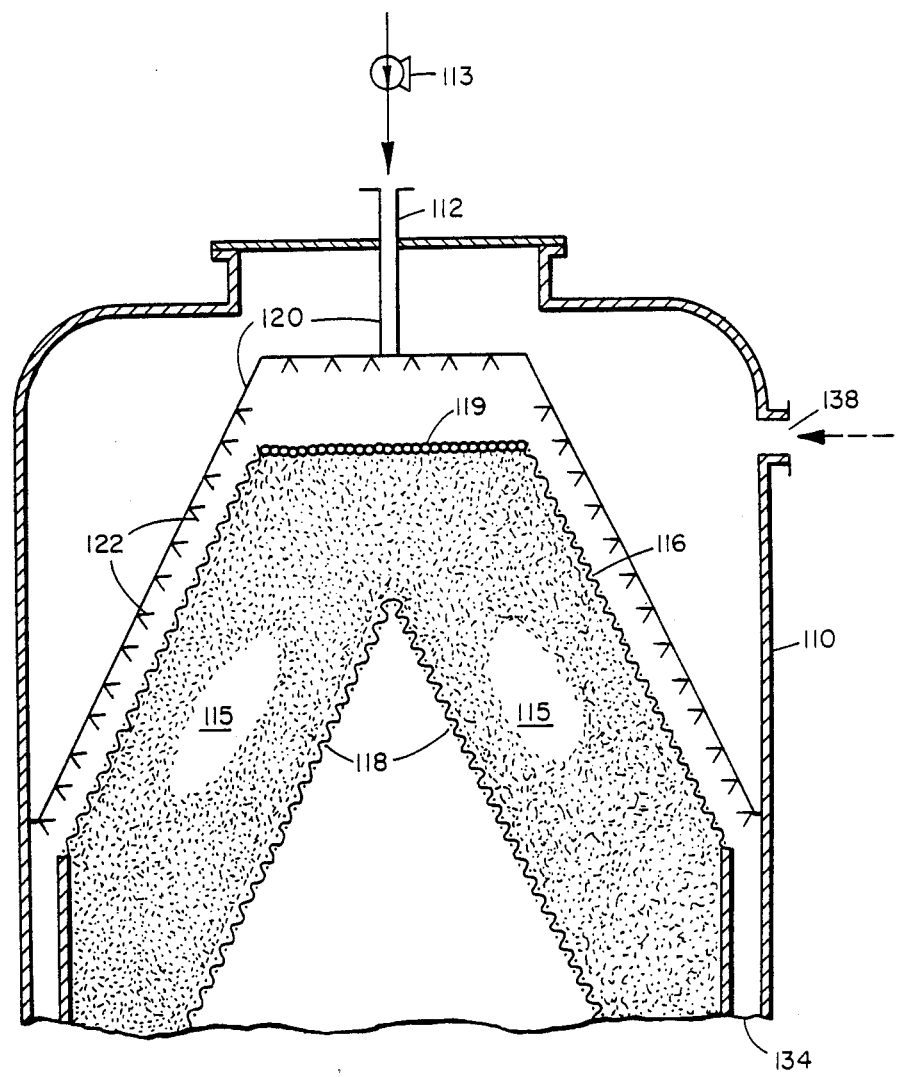
FIG. 2 is a vertical cross-section view of a conical reactor showing a preferred radial gas flow configuration.

An alternative embodiment of the invention is depicted in FIG. 2, which is a vertical cross-section view of the top and middle portions of a reactor vessel with a conoidally shaped catalyst bed. A pressurized shell 110 having a top liquid inlet 112 receives a liquid stream from pump 113. A fixed bed of contact solids 115 is contained by a frustoconical outer screen wall 116 and a conical inner screen wall 118 uniformly spaced from the outer wall to provide for radial gas flow therethrough. The height of the bed above the inner apex is substantially equal to the bed thickness between primary and secondary conoidal surfaces. Catalyst particles may be held in place by a top layer of inert balls 119. The bed may be supported and fluids withdrawn in the manner of FIG. 1. Liquid is distributed separately from the gas via header conduit 120 and spray nozzles 122; however, any suitable means for uniformly introducing liquid through the primary surfaces 116, 119 may be employed. Excess liquid is withdrawn through annular chamber 134. Pressurized gas enters through inlet port 138 and flows evenly to the primary bed surface and thence transversely through the bed 115 in the direction of least pressure drop. The main gas flow is substantially perpendicular to the containment walls 116, 118, with a minor amount entering via the flat top portion 119 into the frustrum shaped bed. It should be understood that the bed may also be supported as an inverted cone on Y-shaped configuration with liquid applied inside and above, and gas flowing radially out.

Figure 4:
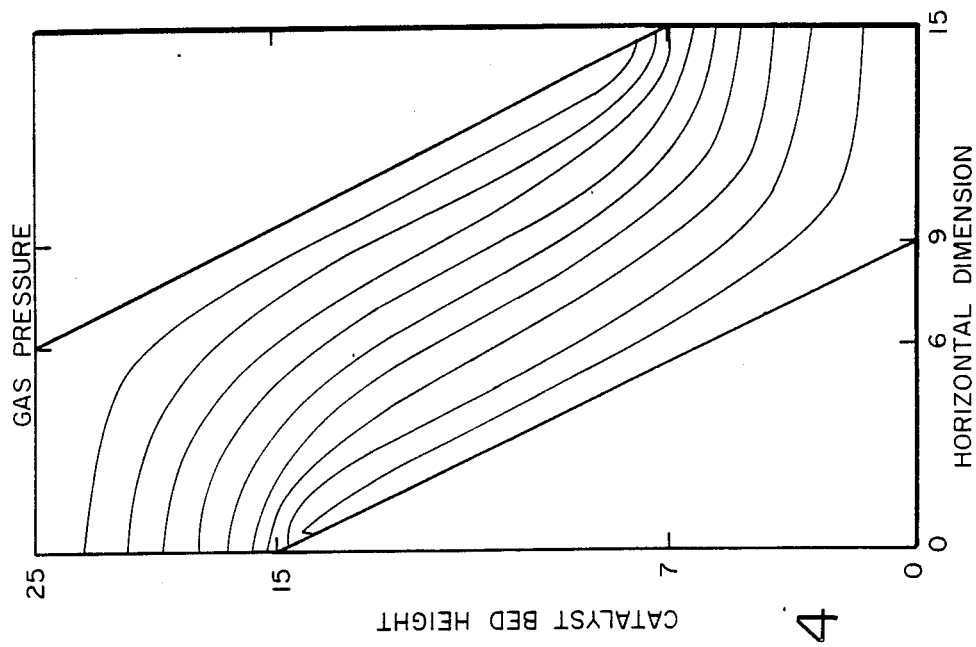
FIG. 4 is a bed pressure profile showing isobars through the porous bed.
Figure 3:
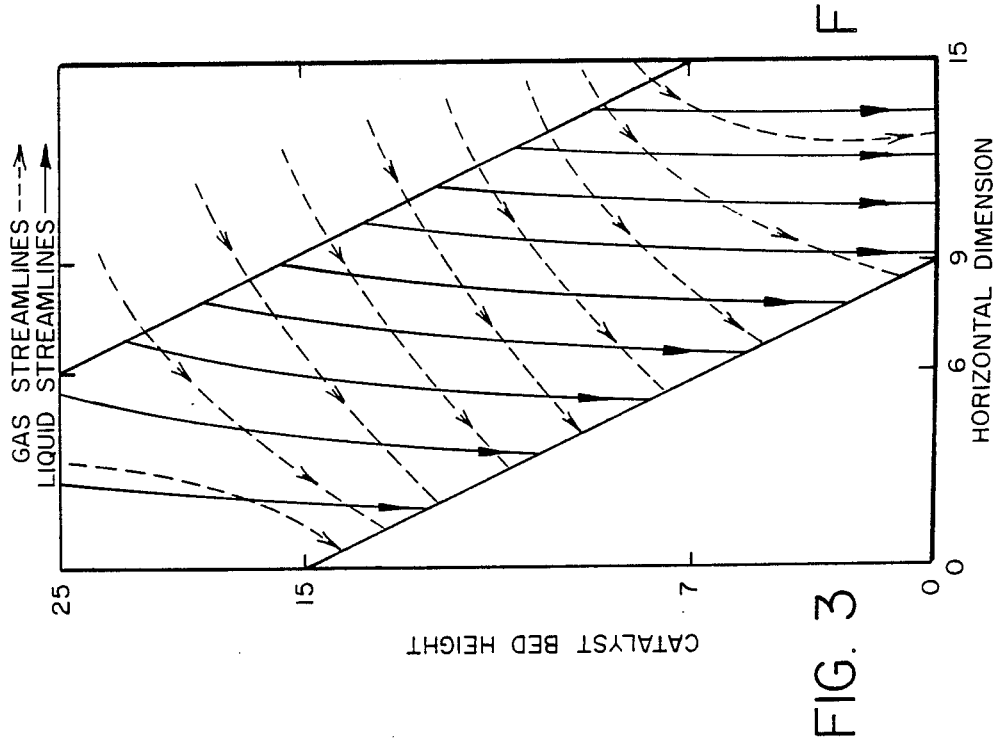
FIG. 3 is a graphic plot of a porous catalyst bed section with typical multi-phase streamline flow depicted.

In order to demonstrate the inventive concept, a typical bed profile is represented in FIGS. 3 and 4. The liquid streamlines (solid) shown in FIG. 3 represent the direction of liquid flow for oil entering a porous bed at spaced points along the outer primary bed surface. Corresponding gas streamlines (dashed) depict the cross flow principle. The profiles in FIGS. 3 and 4 are based on a catalytic hydrodewaxing process employing heavy petroleum gas oil lubricant feedstock at a liquid space velocity of 1 $hr^{-1}$ over a randomly packed bed of 1.5 mm extrudate catalyst of the ZSM-5 type having a porosity (apparent void volume fraction) of 0.36. The hydrocarbon oil has a viscosity of 0.4 centipoise. The reactant gas is fed at a uniform rate of 2100 std. $ft.^3$/barrel of oil, with a pressure drop of 0.1 psi (690 Pascals) across an 8 foot thickness of the bed. The profile section height is 25 feet and maximum base dimension from center to outer wall is 15 feet.

As shown in FIG. 3, the liquid streamlines are substantially uniform, especially for liquid entering in the top portion of the bed. The vertical gravity flow component is the predominant flow vector, with the horizontal component induced by gas averaging about 5 to 10% of the vertical.

FIG. 4 is a graphic plot of pressure, which depicts incremental pressures from the inlet pressure of about 3500 kPa (500 psi). The isobars show calculated pressure drop at 70 Pascal increments across the bed. The combination of horizontal and vertical motions provide in more complete wetting of the catalyst bed by the oil and hence more efficient use of the catalyst volume. The large exposed area of catalyst surface in the sloping bed also contributes to improved oil distribution.

The advantages of the present invention include: (1) uniform liquid residence time in contact with the catalyst (2) crosscurrent flow pattern, decreasing the need for large volumes of gas and alleviating flow maldistribution characteristic of prior art mixed phase cocurrent flow; (3) transversely flowing gas mixing the downward moving liquid and thus facilitating intimate contact between the gas, liquid, and solid (catalyst) phases.

While the invention has been explained by reference to preferred embodiments, there is no intent to limit the inventive concept, except as set forth in the following claims.

What is claimed is:

1. In the process of treating a liquid hydrocarbon stream with a gaseous reactant stream in a porous bed of solid catalyst particles, an improved technique for maintaining uniform distribution of liquid and gas phases comprising:

containing the porous bed of solid particulates so as to define an upper and lower contact zone wherein said upper contact zone is defined by a primary bed surface sloping outwardly and downwardly from the upper contact zone toward the lower contact zone, and a secondary bed surface parallel to said primary bed surface, siad primary bed surface admitting at least a portion of the liquid stream into the porous bed, while permitting the unadmitted portion of the liquid stream to flow by gravity downwardly across said primary bed surface;

distributing the liquid stream at spaced points across said primary bed surface;

maintaining gravity flow of liquid through said porous bed;

introducing the gaseous stream to the contact zone through the primary bed surface and directing the gas flow toward the secondary bed surface transverse to liquid flow; and recovering the treated hydrocarbon liquid and gas streams.

2. In the process of treating a liquid stream with a gaseous stream according to claim 1, wherein said hydrocarbon comprises a waxy oil, said gaseous reactant comprises hydrogen and said catalyst particles comprises a silceous zeolite having a constraint index of about 1 to 12, for selective hydrodewaxing of the hydrocarbon stream.

3. In the process of treating a liquid stream with a gaseous stream according to claim 2, wherein said zeolite consists essentially of an acidic ZSM-5 type pentasil aluminosilicate having a silica to alumina mole ratio greater than 12.

4. In the process of treating a liquid stream with a gaseous stream in a contact zone containing a porous bed of contact solids, an improved technique for maintaining uniform distribution of liquid and gas phases comprising containing the porous bed of contact solids to define upper and lower zones wherein said upper contact zone is defined by a primary bed surface sloping outwardly and downwardly from said upper contact zone toward said lower contact zone, said primary bed surface facing the distributed liquid stream to admit at least a portion of the liquid stream into the porous bed through said primary bed surface, while permitting unadmitted liquid to flow by gravity downwardly across the sloping primary surface;

distributing the liquid stream at spaced points across the contact solids at a primary bed surface;

maintaining gravity flow of liquid through said porous bed;

containing contact solids with a secondary bed surface substantially parallel to said primary bed surface;

introducing the gaseous stream to the contact zone through the primary bed surface and directing the gas flow toward the secondary bed surface transverse to liquid flow at sufficient rate to drive gravitating liquid with a horizontal vector; and recovering the treated liquid and gas streams downstream from the porous bed.

5. The process of claim 4 wherein the contact solids have a porosity void fraction of at least 0.25 and an average liquid void saturation of about 0.15 to 0.50.

6. The process of claim 4 wherein liquid streamlines from the primary bed surface to the secondary bed surface have an average horizontal vector at least 5% of the corresponding vertical vector.

7. A multiphase cross-current catalytic reactor comprising a reactor vessel having inlet means for liquid and gaseous reactant streams;

catalyst containment means within said reactor vessel for retaining a fixed porous bed of catalyst particles; said containment means comprising a plurality of foraminous side walls for admitting and removing reactant gas in crosscurrent flow transverse to gravitating liquid flow, where said foraminous side walls define an upper contact zone and a lower contact zone, wherein at least one of said foraminous side walls slopes outwardly and away from said upper zone to said lower zone;

liquid distributor means adapted for applying liquid reactant onto a top portion of said upper zone;

liquid projection means for distributing a reactant liquid stream onto said outwardly sloping foraminous surface whereby the liquid reactant stream passes through said foraminous side wall into the porous catalyst bed; and means for recovering catalytically treated liquid from said porous bed.

8. The reactor of claim 7 wherein the catalyst bed has a void volume fraction of about 0.25 to 0.50.

9. The reactor of claim 7 wherein the porous bed has a frustroconical shape.

10. The reactor of claim 7 further comprising gas plenum means for recovering reactant gas from the porous bed.

11. The reactor of claim 10 comprising pump means for supplying liquid reactant to the catalyst bed at a rate sufficient to occupy about 10 to 50 percent of the void volume thereof.

* * * * *